US008652585B2

(12) United States Patent
Roeck

(10) Patent No.: US 8,652,585 B2
(45) Date of Patent: Feb. 18, 2014

(54) METHOD FOR COATING A COMPONENT

(75) Inventor: Rainer Roeck, Aidlingen (DE)

(73) Assignee: Daimler AG, Stuttgart (DE)

( * ) Notice: Subject to any disclaimer, the term of this patent is extended or adjusted under 35 U.S.C. 154(b) by 284 days.

(21) Appl. No.: 13/144,534

(22) PCT Filed: Dec. 18, 2009

(86) PCT No.: PCT/EP2009/009112
§ 371 (c)(1),
(2), (4) Date: Jul. 14, 2011

(87) PCT Pub. No.: WO2010/088941
PCT Pub. Date: Aug. 12, 2010

(65) Prior Publication Data

US 2011/0274855 A1 Nov. 10, 2011

(30) Foreign Application Priority Data

Jan. 16, 2009 (DE) ........................ 10 2009 005 079

(51) Int. Cl.

| | |
|---|---|
| ***B05D 3/06*** | (2006.01) |
| ***G21H 5/00*** | (2006.01) |
| ***C08J 7/18*** | (2006.01) |
| ***B05D 3/00*** | (2006.01) |
| ***B05D 1/02*** | (2006.01) |
| ***B05D 5/00*** | (2006.01) |

(52) U.S. Cl.
USPC ........ 427/558; 427/427.2; 427/424; 427/553; 427/532

(58) Field of Classification Search
USPC .......... 34/275, 276, 277, 278, 4, 39; 118/300, 118/305, 313, 314, 315, 316, 326, 620, 630, 118/634, 641, 642; 219/385, 388; 427/421.1, 424, 427.2, 427.3, 532, 427/542, 553, 558
See application file for complete search history.

(56) References Cited

U.S. PATENT DOCUMENTS

| | | | | | |
|---|---|---|---|---|---|
| 2,236,398 | A | | 3/1941 | Drummond | |
| 2,767,297 | A | * | 10/1956 | Benson | 219/411 |
| 4,621,187 | A | * | 11/1986 | Petro, Jr. | 392/414 |
| 5,445,324 | A | * | 8/1995 | Berry et al. | 239/99 |
| 5,769,703 | A | * | 6/1998 | Conlin | 454/50 |
| 2007/0272150 | A1 | * | 11/2007 | Swoboda et al. | 118/642 |
| 2008/0271669 | A1 | * | 11/2008 | Butterworth | 118/300 |
| 2009/0117283 | A1 | | 5/2009 | Herre et al. | |
| 2009/0288310 | A1 | * | 11/2009 | Sturm et al. | 34/275 |

FOREIGN PATENT DOCUMENTS

| | | | | |
|---|---|---|---|---|
| DE | 10255419 | A1 | | 6/2004 |
| DE | 10354165 | B3 | | 11/2004 |
| DE | 102005050371 | A1 | | 4/2007 |
| DE | 102008014378 | A1 | | 9/2008 |
| WO | WO 2007045442 | A1 | * | 4/2007 |
| WO | 2007131660 | A1 | | 11/2007 |

* cited by examiner

*Primary Examiner* — Michael Wieczorek
(74) *Attorney, Agent, or Firm* — Patent Central LLC; Stephan A. Pendorf

(57) ABSTRACT

The invention relates to a method for coating a component (16), wherein the component (16) is provided with at least one coating layer that can be cured by applying UV light, said layer having UV light applied thereto in an exposure chamber (14) comprising a substantially spherical or ellipsoidal interior (18), wherein the at least one coating layer is applied to the component (16) in a coating chamber (12) comprising the exposure chamber (14).

14 Claims, 2 Drawing Sheets

METHOD FOR COATING A COMPONENT

Figure 1:
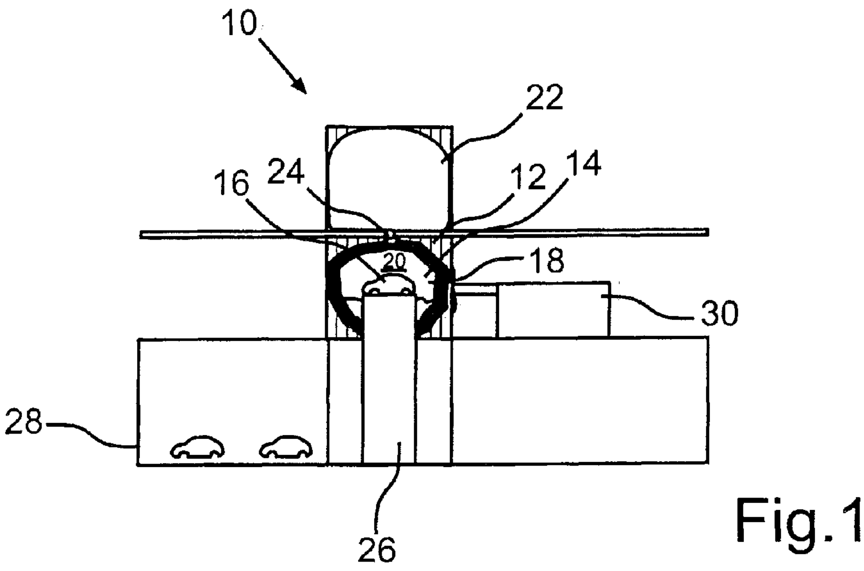

The invention relates to a method for coating a component, wherein the component is provided with at least one coating layer or varnish that can be cured by applying UV light, which is applied with UV light in an exposure chamber having an essentially spherical ellipsoidal interior. The invention additionally relates to a coating device.

For coating, particularly for example for coating component, it is nowadays usual to use coatings or similar materials or material mixtures, which have to be cured on the corresponding component after the application. So-called UV-curable coatings or materials are often used, which can be cured by means of UV radiation. The UV curing can thereby takes place in specially constructed exposure chambers. For the production of fully cured thin coating layers or coatings with a good rigidity, the curing with the exclusion of air oxygen is usually necessary. Thus, exposure chambers are known, which ensure the curing of UV-curable coatings under protection gas in a very good manner due to their design, as for example disclosed in DE 2008 014 378 A1. The processes of the coating or finishing taking place temporally and locally in a separated manner, such as the application of the respective layers and a subsequent chemical curing and/or curing by means of UV light have respectively different requirements of the environment. The corresponding entire process is hereby often costly and time-consuming.

It is the object of the present invention to provide a method for coating a component, wherein the component is provided with at least one coating layer or varnishing that can be cured by means of applying UV light, which is applied with UV light in an exposure chamber having an essentially spherical or ellipsoidal interior, which proceeds in a time-saving and user-friendly manner and whereby costs can be saved.

This object is solved according to the invention by a method with the characteristics of claim 1. Advantageous arrangements with convenient and non-trivial further developments of the invention are given in the further claims.

In order to provide a method for coating a component of the above-mentioned type, which is designed in a time-saving, cost-efficient and user-friendly manner, it is provided according to the invention that the at least one coating layer or varnishing layer is applied to the component in a coating chamber, which simultaneously comprises the exposure chamber for curing the applied varnish. Time and costs can be saved hereby, as a time-consuming transport of the component is no longer necessary between different chambers. The corresponding coating and the curing by means of UV light can now be integrated and take place in one and the same chamber.

In a further arrangement, it is advantageous that the UV light is generated by UV lamps distributed spherically above the inner wall of the exposure chamber, whose light is focused concentrically on a central point or a longitudinal axis of the exposure chamber. This enables an ideal exposure and thus also curing of the varnish or coating layer to be cured on the component. Further advantageous arrangements of an exposure chamber that can be used in the invention are described in DE 10 2008 014 378 A1.

It is furthermore advantageous if at least one coating layer is applied to the component in the exposure chamber. The spatial integration of the coating or the varnishing and curing is ensured in an even better manner. The corresponding components do no longer have to be transported after the application of the coating, as they are already present therein.

In a further arrangement, the component is thereby surrounded by an inert gas during the coating and/or during the application of UV light. The coating and the curing by means of UV light can thus proceed under inerting conditions, which largely improves the quality of the coating. The varnishing and the UV curing of the varnish are carried out under protective gas in a particularly preferred manner, particularly in the same protective gas atmosphere.

An inert gas is thereby advantageously introduced into the exposure chamber. The missing inhibiting effect of oxygen thus effects a good acceleration and improvement of the beam curing in the exposure chamber.

It is further advantageous if an inert gas is introduced into the coating chamber, that is, a gas which does not contain any radical interceptors, as particularly oxygen. The coating and the curing can hereby proceed in the same chamber under the same inert conditions. A closed system is generated, which is only opened in exceptional situations, for example for feeding and removing components.

In an advantageous arrangement, helium is thereby used as the inert gas. The low density of the He can be used in an advantageous manner to considerably simplify the sluicing technique. The coating chamber and the exposure chamber are designed in a particularly preferred manner gas-tight towards the top, wherein the supply opening for the components is at the bottom. In a particularly advantageous manner, no sluicing technique has to be used. The coating and the curing in an inherent, helium-filled coating chamber or a helium-filled exposure chamber can take place in a spatially integrated manner. In the best case, the corresponding chambers basically remain filled with the inert gas, preferably helium, and are only freed from the inert gas or particularly from helium in special situations, as for example due to maintenance operations.

It is thereby advantageous if a container above the exposure chamber and/or the coating chamber is possibly used for storing the inert gas. In this manner, the inert gas, for example the helium, can be guided into the container for maintenance operations, in order to temporarily free the exposure chamber and/or the coating chamber from the inert gas.

For the common function of the varnishing and UV coating, it is important that the UV lamps or the UV light mirrors or the walls of the exposure chamber are not loaded with varnish from the varnishing process, which is not deposited on the component (so-call) overspray). The varnishing process is thus adjusted in such a manner that the overspray is guided away from the lamps, mirrors and walls. For this, the flow of the inert gas is guided in a suitable manner.

Advantageously, a laminar flow of the inert gas possibly flows through at least one permeable chamber limitation of the coating chamber and/or the exposure chamber. It is thereby essential that a laminar flow forms during the coating process arranged along the component. This laminar flow, in particular on the component surface, is used for receiving and the guiding away of overspray. In a particularly preferred manner, the laminar inert gas flow is directed to the opening of the coating chamber lying at the bottom. The guiding away of overspray from the UV lamps, mirrors and walls of the exposure chamber can be supported by a plurality of inert gas nozzles in the walls of the exposure or coating chamber.

The overspray reception can thereby also be carried out a spatially integrated, cost-saving and time-saving manner.

In a further arrangement, at least one coating layer is applied by means of a varnishing robot. The coating in an inerting environment can hereby take place spatially integrated with the UV light curing in an automated manner.

It is thereby advantageous if at least one varnishing robot metallized with a teflon layer is used. The teflon layer thereby prevents damages of the varnishing robots for example by means of the UV radiation or varnishing sprays and a reduction of the UV radiation, as a reflexion of the UV radiation is achieved by the metallization.

In a further arrangement, at least one varnishing robot is positioned in the interior of the exposure chamber during the application. Alternatively or also simultaneously, at least one varnishing robot is removed from the exposure chamber during the application of the UV light. It can thus be prevented that the varnishing robots throw a shadow during the application, which influences the curing of the coating in a negative manner. The varnishing robots can additionally be protected better in this way.

In a further arrangement, at least one coating layer is applied by means of a varnishing robot. The known technical advantages of the varnishing jacket are used, in order to carry out the coating of the component spatially integrated with the UV radiation curing.

It is thereby advantageous that the varnishing jacket is operated by means of a guide gas. If helium is used for operating the varnishing jacket, the inert environment remains constant in an improved manner during the coating. If helium is used as inert gas, the same gas can be used for operating the varnishing jacket.

Advantageously, a component that can be used in the vehicle construction is preferably used, wherein a motor vehicle body is coated in a particularly preferred manner.

The invention further relates to a coating device for carrying out a method with at least one of the above-described characteristics. In a further arrangement, it is thereby advantageous if the coating device is designed in such a manner that several methods can be carried out in parallel in respective UV pulse coating modules as described above. Hereby, the method according to the invention can be carried out in an improved manner to a large extent in a cost-saving and time-saving manner or the corresponding coating device according to the invention can be used.

Advantageously, at least two UV pulse coating modules are thereby connected to each other by means of a conveying means. Further advantages, characteristics and details of the invention result from the following description of a preferred embodiment and by means of the drawing.

Figure 2:
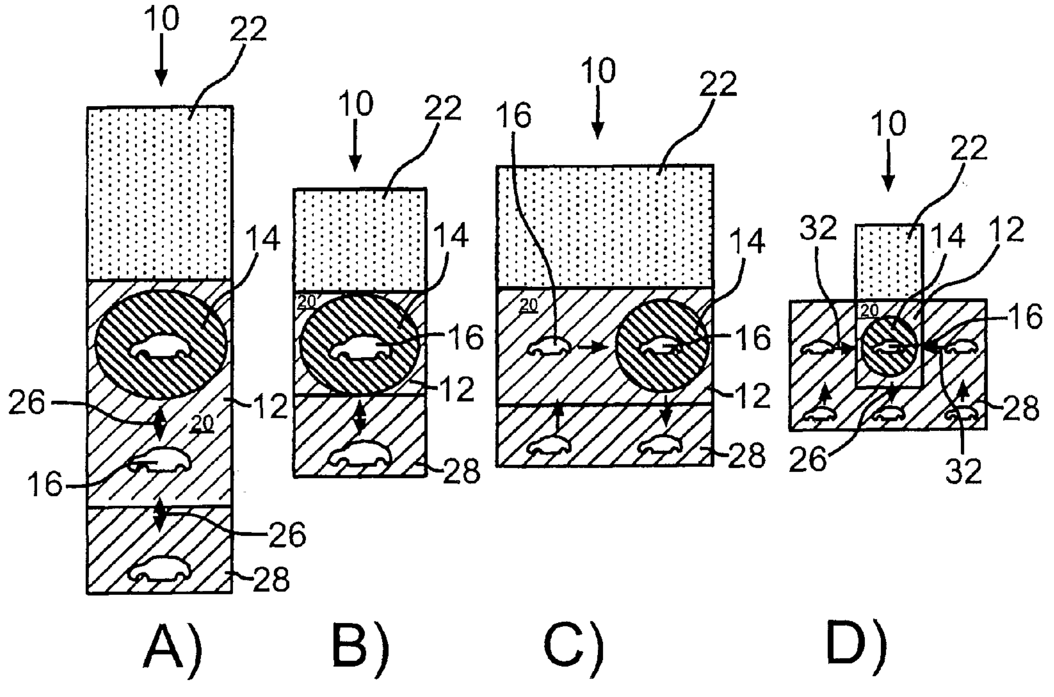
Figure 3:
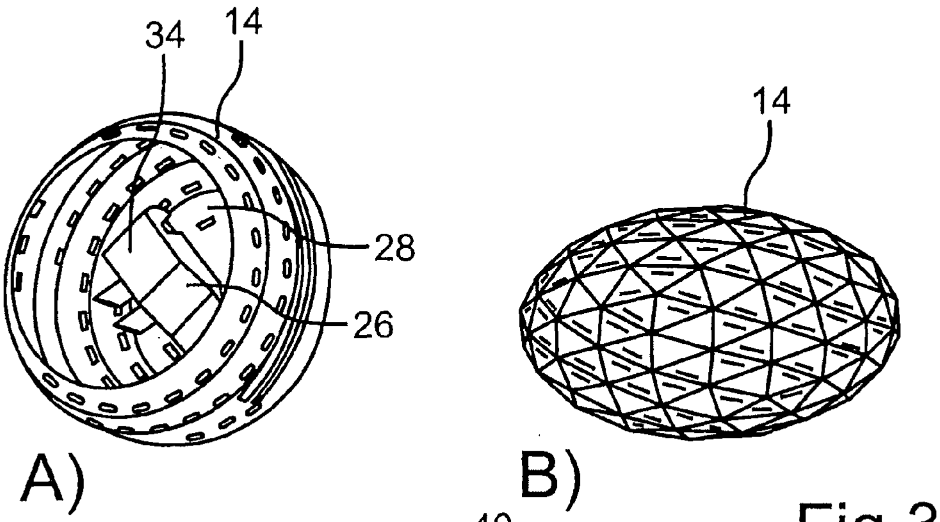
Figure 4:
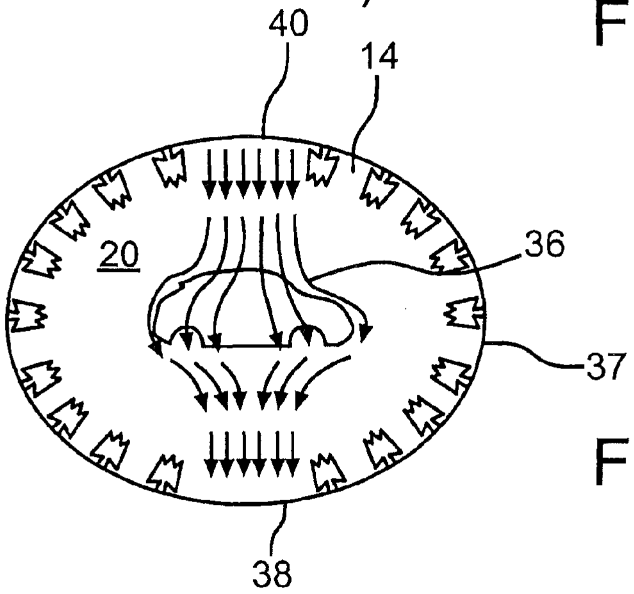
Figure 5:
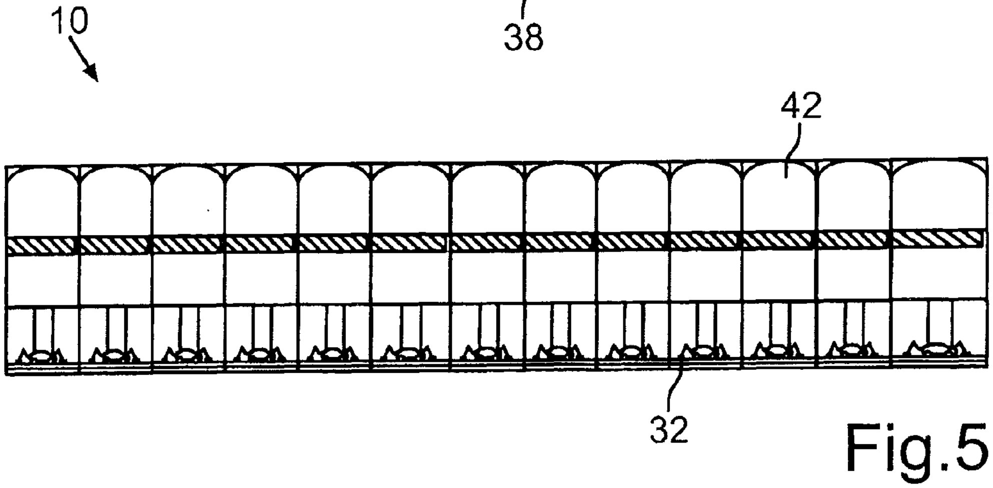

It shows thereby:

FIG. 1 a schematic sectional side view of a coating device for carrying out a method for coating a component, wherein the component is provided with at least one coating layer that can be cured by means of applying UV light, which layer is applied with UV light in an exposure chamber having a substantially spherical or ellipsoidal interior, wherein the coating layer is applied to the component in coating chamber, which comprises the exposure chamber;

FIG. 2 a simplified representation of a schematic sectional side view of a coating device, in which a method for coating a component can be carried out, wherein the component is provided with at least one coating layer that can be cured by means of applying UV light, which layer is applied with UV light in an exposure chamber having a substantially spherical or ellipsoidal interior, wherein A) a coating layer is applied to the component in the coating chamber, and is exposed in an exposure chamber arranged at a higher level, B) the at least one coating layer is applied to the component in the exposure chamber, C) the at least one coating layer is applied to the component laterally of the exposure chamber within the coating chamber, and D) the at least one coating layer is applied to the component laterally of the exposure chamber within the coating chamber on both sides, wherein only the exposure chamber is inerted with helium 4;

FIG. 3 a perspective view of an exposure chamber for carrying out a method for coating a component, wherein the exposure chamber is shown open from the above for viewing into the exposure chamber (A) or a schematic lateral perspective (B) on an exposure chamber for carrying out a method for coating two components, which is formed as an obtuse Pentakis dodecahedron;

FIG. 4 a schematic cross section through an exposure chamber of a coating device for carrying out a method for coating a component, wherein a laminar flow of an inert gas is shown in a graphical manner;

FIG. 5 a side view of a coating device for carrying out a method for coating a component, wherein a coating layer is applied to the component in a coating chamber, which comprises the exposure chamber, wherein several methods can be carried out in parallel in respective UV pulse coating modules.

In FIG. 1 can be seen a coating device 10, which has a coating chamber 12 and an exposure chamber 14. The component 16 is a motor vehicle body 17 in the shown embodiment. It can of course also be any other component 16, the invention however relates to components 16 that can be used on the motor vehicle construction, as for example the shown motor vehicle body 17. The component 16 is thereby provided with at least one coating layer that can be cured. The exposure chamber 14 has a substantially ellipsoidal interior 16 in the present embodiment, this can theoretically also be formed spherical. The motor vehicle body 17 is applied with UV light within the ellipsoidal interior 18. At least one coating layer is applied to the motor vehicle body 17 in the coating chamber 12, in which the exposure chamber 14 is also present. The application of the varnish layer and the subsequent UV curing are hereby integrated spatially. In the embodiment shown in FIG. 1, the coating layer is even applied to the motor vehicle body 17 even in the exposure chamber 14.

In order to provide the best possible conditions for the coating and the UV curing, the component 16 is surrounded with an inert gas 20 during the coating and/or the application of UV light. The inert gas 20 is thereby in the exposure chamber 14, in the present case it is helium. It has thereby been shown that the helium content is most suitably about 99%. Hereby it is ensured that the oxygen content is less than 1%, which ensures a better process. By means of the low oxygen content of air, the oxygen part with the preferred helium concentration of about 99% is even below 0.3%. The helium preferably remains constant and continuous in the exposure chamber during the entire process and also during the exchange of for example the motor vehicle body 17 against a further component 16 or a further motor vehicle body 17. In particular cases, a container 22, which is arranged above the exposure chamber 14, is possibly used for storing the inert gas 20. This can for example take place for the maintenance of the coating device 10. It is thus a counter container 22, in the present embodiment a helium counter container 22, which is connected to the interior 18 of the exposure chamber 14 by means of a closeable flow opening 24. The coating device 10 thereby comprises pumping devices, not shown, by means of which the inert gas 20 can be pumped into the counter container 22.

The coating device 10 additionally has a lifting device 26. By means of the lifting device 26, components 16 to be coated, in the present embodiment the motor vehicle bodies

17, are lifted from a lower level 28 into the exposure chamber 14. The motor vehicle bodies 17 are coated in the coating chamber 14 and the coating is cured by means of UV light. The varnishing of the motor vehicle bodies 17 can thereby take place by means of varnishing robots. Commercial varnishing jackets can be used, which are operated by means of a guide gas. In order to ensure a best possible UV exposure during the UV curing by UV beams, the varnishing robots are either displaced into provided parking positions or are removed completely from the exposure chamber 14. For removing the varnishing robots from the exposure chamber 14, flaps that can be opened are provided, through which the varnishing robots are possibly removed from the exposure chamber 14 during the method. As helium is used in the present embodiment as the inert gas 20, it is advantageous in this case to also use helium as guide gas for the varnishing jacket.

In the method according to the invention, MonoCure systems and DualCure systems can be used. In the MonoCure system, a radical polymerization of the applied coating layer results thereby, initiated by UV light. By means of the very good exposure properties in the exposure chamber 14, in which the UV light is generated by UV lamps distributed spherically over the inner wall of the exposure chamber 14, whose light is focused concentrically on a central point or a longitudinal axis of the exposure chamber 14, MonoCure methods can be carried out very well. For DualCure methods, where radical polymerization, initiated by UV Hight, and after-curing takes place by means of NCO—OH reactions, the helium can be heated by means of a heating device 30. The temperature of the inert gas 20 or of the helium can thus be regulated by means of the heating device 30. Any arbitrary temperature within the scope of the technical possibilities can of course be adjusted for carrying out a method.

Multi-layered varnishing and curing takes place in the same coating chamber 12 or the exposure chamber 14 filled with an inerting gas 20. This comprises the application for applying so-called base layers (Base Coat), and also the so-called Clear-Coat layers. The sequence and number of the application of the corresponding layers and the respective exposure phases in the exposure chamber 14 can thereby varied in the method free according to the wish of the user. Methods are preferred, where the quality state of the course is controlled by means of sensors or other measuring elements. The curing processes can thereby be controlled depending on requirement in their dimension and chronological course. Corresponding exposure times and/or exposure intensities can be controlled in the method and can be varied individually.

At the lower level 28, the motor vehicle body 17 is cleaned for example with robots carrying blade brushes after lowering the motor vehicle body 17 by means of the lifting device 26. This is not shown in FIG. 1. The overspray separation can also proceed in the exposure chamber 14, which is filled with the inerting gas 20. The applications are possible on the outside and inside, that is, at respective fold connections of for example doors or similar at motor vehicle bodies 17, which are difficult to access with a pure outer application. For this, doors or flaps of the motor vehicle body 17 are actuated during the application by means of a corresponding device, in order to be able to carry out the respective inner applications by means of the varnishing robots. The UV curing can take place by means of a sensor monitoring, in order to ensure an optimum UV exposure time.

In FIG. 2 are shown different versions for carrying out the method for coating a component 16. Coating devices 10 with a coating chamber 12, an exposure chamber 14 and a container 22 for receiving helium in given cases can again be seen in FIG. 2A to 2D.

In an embodiment of the invention not according to the invention, the coating chamber 12 is now filled completely with the inert gas 20, in this case helium. The component 16, in this case again a motor vehicle body 17 is now coated in the coating chamber 12 filled with the inert gas 20 with at least one coating layer. The curing by means of application of UV light in the substantially ellipsoidal exposure chamber 14 takes place in the same coating chamber, but above the position where the motor vehicle body 17 is coated.

The body 17 is transported with the help of lifting devices 26 shown in a graphically simplified manner within the different positions.

In FIG. 2B is also shown a coating chamber 12, which is completely filled with the inert gas 20. The application of the coating layers however takes place in the exposure chamber 14, such as the curing by means of UV light.

In an embodiment (FIG. 2C) not according to the invention, the motor vehicle body 17 is coated lateral of the exposure chamber 14, however in the same coating chamber 12. In a further embodiment (FIG. 2D) not according to the invention, the motor vehicle bodies 17 to be coated are supplied to the exposure chamber 12 filled completely with the inert gas 20, thus helium, by means of conveyor means that are shown in a graphically simplified manner. After the coating and/or the curing, the body 17 is transported to the lower level 28 by means of a lifting device 26 shown in a graphically simplified manner.

In FIG. 3, the exposure chamber 14 can be seen in a perspective view. In the interior 18, UV lamps are thereby arranged spherically, whose light is directed concentrically to a central point 34, where the varnishing and the subsequent UV curing takes place. FIG. 3B shown the elliptical form of an exposure chamber from the outside. The exposure chamber 14 is thereby formed as an obtuse Pentakis dodecahedron in a compressed ellipsoidal form. The characteristics of the exposure chamber 14 are for example described in DE 2008 014 378 A1. The exposure can additionally also be carried out with UV average pressure lamps. The exposure chamber 14 is further limited to the inside by means of UV-reflecting teflon plates. Depending on requirement, preferably 100 to 500 UV radiators are arranged at the teflon plates. This is not shown in FIG. 3. The UV radiators are for example operated in the pulse operation, which comprises for example a pulse operation of about 2 seconds. The energy performance can thereby for example be 15 kW.

In FIG. 4 is shown how the overspray separation is carried out by means of a laminar flow. A helium flow is thereby used as flow 36. By means of the use of helium as inert gas 20 and simultaneously as gas 20 for generating the laminar flow 36, it is ensured that the inert, process-favorable atmosphere is maintained continuously in the exposure chamber 14. The method proceeds hereby in a closed system. The overspray reception can be carried out very well by means of the laminar helium flow. A chamber limitation 37 of the exposure chamber 14 is interrupted for this at an upper or lower region 38, 40, and can thus be flown through by the helium flow 36. The chamber limitation 37 can of course also be interrupted at any possible other locations for the flow-through of a laminar flow 36. It is important that a closed cycle is ensured by corresponding lines, which are not shown in FIG. 4. Thereby, losses are minimized and the environment is preserved.

In FIG. 5 is shown a coating device 10, wherein several UV pulse coating modules 42 are shown next to each other. Respective UV pulse coating modules 42 are thereby connected to each other by means of a conveying means 32. In a respective UV pulse coating module, a method as described above can be carried out. The method can hereby be carried out largely in an automated and cost-efficient manner.

List of Reference Numerals

10 Coating device
12 Coating chamber
14 Exposure chamber
16 Component
17 Motor vehicle body
18 Inner chamber
20 Gas
22 Container
24 Flow opening
26 Lifting device
28 Level
30 Heating device
32 Conveyor means
34 Central point
36 Flow
37 Chamber limitation
38 Region
40 Region
42 UV pulse coating module

The invention claimed is:

1. A method for coating a component (16), comprising:
providing the component (16) with at least one UV-curable coating layer, and
curing the UV-curable coating layer with UV light in an exposure chamber (14) comprising a substantially spherical or ellipsoidal interior (18),
wherein the UV light is generated by UV lamps, which are arranged at the inner wall in the interior of the exposure chamber (14), whose light is focused concentrically on a central point (34) or a longitudinal axis of the exposure chamber (14),
wherein at least one coating robot is positioned between the UV lamps during the application of the UV light in the interior (18) of the exposure chamber (14),
wherein the at least one UV-curable coating layer is applied to the component (16) in the exposure chamber (14), and
wherein, during the process of providing the component with at least one UV-curable coating layer in the exposure chamber (14), a laminar flow of inert gas is flowed along the component (16), whereby overspray is entrained and guided away from the UV lamps and the inner wall of the exposure chamber (14) and the component (16) is surrounded with an inert gas (20) during the step of providing the component with at least one UV-curable coating layer and during the application of UV light.

2. The method according to claim 1, wherein at least one inert gas is introduced into the exposure chamber (14) during the UV exposure.

3. The method according to claim 1, wherein helium is used as inert gas (20).

4. The method according to claim 1, wherein a container (22) above the exposure chamber (14) is used for storing the inert gas (20).

5. The method according to claim 1, wherein the laminar flow of the inert gas (20) flows through at least one permeable chamber limitation of the exposure chamber (14).

6. The method according to claim 1, wherein at least one coating layer is applied by means of at least one coating robot.

7. The method according to claim 6, wherein at least one polytetrafluoroethylene coated coating robot is used.

8. The method according to claim 1, wherein at least one coating layer is applied via a coating jacket.

9. The method according to claim 8, wherein the coating jacket is operated via a guide gas.

10. The method according to claim 9, wherein helium is used as guide gas for operating the coating jacket.

11. The method according to claim 1, wherein a component (16) that can be used in the vehicle construction is coated or that a vehicle body is coated.

12. The method according to claim 1, wherein the at least one UV-curable coating layer is a varnish that can be cured by applying UV light.

13. A method for coating a component (16), comprising:
providing the component (16) with at least one UV-curable coating layer, and
curing the UV-curable coating layer with UV light in an exposure chamber (14) comprising a substantially spherical or ellipsoidal interior (18),
wherein the UV light is generated by UV lamps, which are arranged at the inner wall in the interior of the exposure chamber (14), whose light is focused concentrically on a central point (34) or a longitudinal axis of the exposure chamber (14),
wherein the at least one UV-curable coating layer is applied to the component (16) in the exposure chamber (14), and
wherein, during the process of providing the component with at least one UV-curable coating layer in the exposure chamber (14), a laminar flow of inert gas is flowed along the component (16), whereby overspray is entrained and guided away from the UV lamps and the inner wall of the exposure chamber (14) and the component (16) is surrounded with an inert gas (20) during the step of providing the component with at least one UV-curable coating layer and during the application of UV light,
wherein at least one coating layer is applied by means of at least one coating robot, and
wherein the at least one coating robot is removed from the exposure chamber (14) during the application of the UV light.

14. The method according to claim 13, wherein the at least one UV-curable coating layer is a varnish that can be cured by applying UV light.

* * * * *